United States Patent [19]
Murakami

[11] Patent Number: 4,920,547
[45] Date of Patent: Apr. 24, 1990

[54] STUFF SYNCHRONIZATION CIRCUIT

[75] Inventor: Kurenai Murakami, Tokyo, Japan

[73] Assignee: NEC Corporation, Japan

[21] Appl. No.: 127,498

[22] Filed: Dec. 1, 1987

[30] Foreign Application Priority Data

Dec. 2, 1986 [JP] Japan .................................. 61-287448

[51] Int. Cl.$^5$ ................................................ H04L 7/00
[52] U.S. Cl. ................................. 375/112; 370/102; 375/118
[58] Field of Search ................. 375/112, 118; 370/102, 370/108

[56] References Cited

U.S. PATENT DOCUMENTS

| | | | |
|---|---|---|---|
| 3,961,136 | 6/1976 | Cohen et al. | 375/112 |
| 4,072,826 | 2/1978 | Aveneau | 370/102 |
| 4,147,895 | 4/1979 | Fenoglio | 375/112 |
| 4,347,620 | 8/1982 | Black et al. | 375/112 |
| 4,397,017 | 8/1983 | Rokugo | 375/112 |

Primary Examiner—Robert L. Griffin
Assistant Examiner—Marianne Huseman
Attorney, Agent, or Firm—Ostrolenk, Faber, Gerb & Soffen

[57] ABSTRACT

A stuff synchronization circuit includes a memory, a phase comparison D flip-flop, a stuff judgment flip-flop, and a control section including selectors and an encoder. In the memory, writing and reading are performed at different timings. The phase comparison D flip-flop detects a phase difference between a write timing for a specific bit included in data input to the memory and a read timing for the specific bit. The stuff judgment D flip-flop judges an insertion timing of stuff pulses on the basis of the detected phase difference. The control section keeps a time interval between a time at which the phase difference is detected by the phase comparison D flip-flop and a time at which the insertion timing of stuff pulses is judged by the stuff judgment D flip-flop constant.

10 Claims, 4 Drawing Sheets

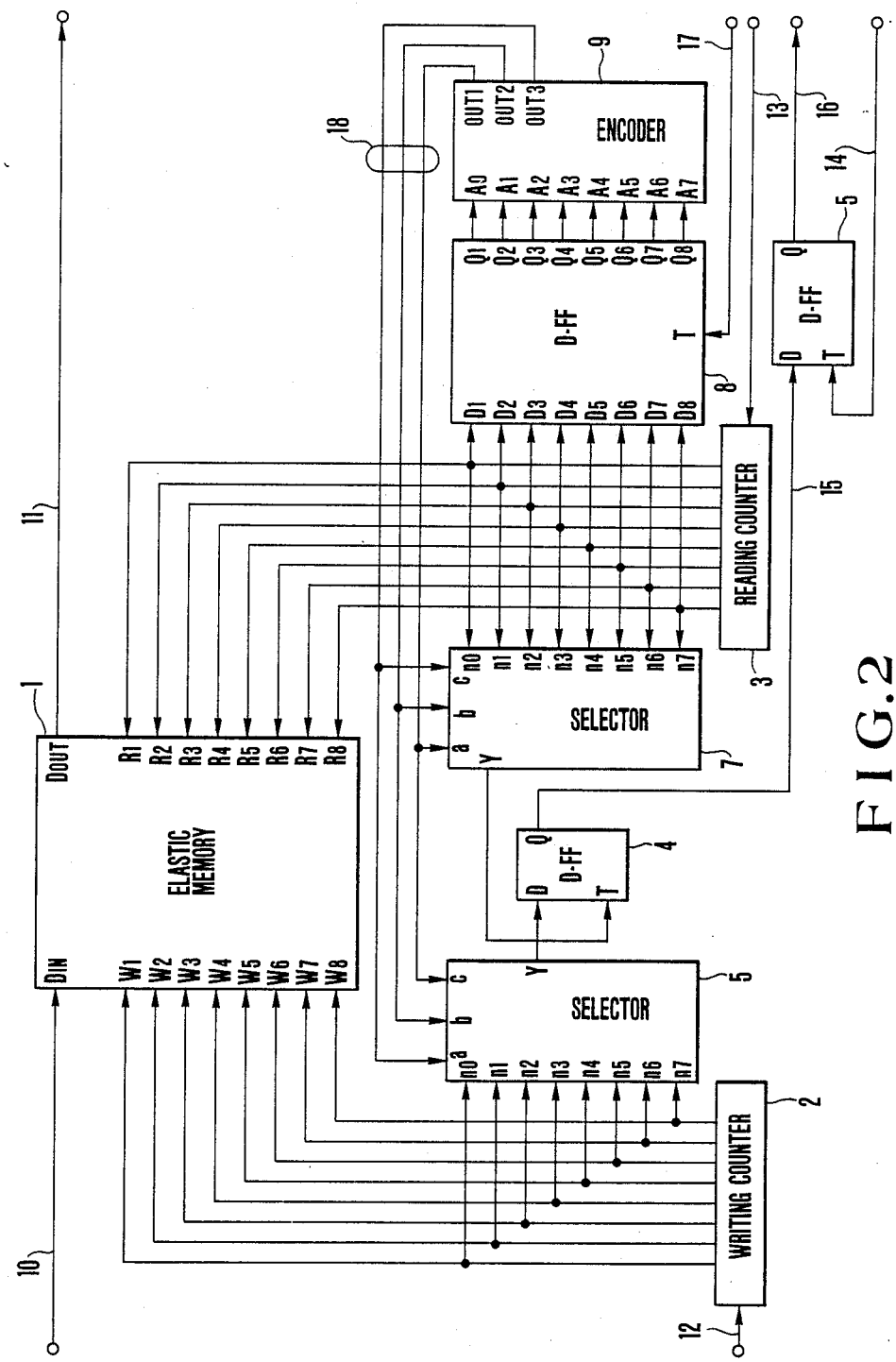
F I G. 2

| SELECTOR 7 | | | | | | | | | | | |
|---|---|---|---|---|---|---|---|---|---|---|---|
| INPUT | | | | | | | | CONTROL | | | OUTPUT |
| n0 | n1 | n2 | n3 | n4 | n5 | n6 | n7 | a | b | c | Y |
| 0/1 | × | × | × | × | × | × | × | 0 | 0 | 0 | 0/1 |
| × | 0/1 | × | × | × | × | × | × | 1 | 0 | 0 | 0/1 |
| × | × | 0/1 | × | × | × | × | × | 0 | 1 | 0 | 0/1 |
| × | × | × | 0/1 | × | × | × | × | 1 | 1 | 0 | 0/1 |
| × | × | × | × | 0/1 | × | × | × | 0 | 0 | 1 | 0/1 |
| × | × | × | × | × | 0/1 | × | × | 1 | 0 | 1 | 0/1 |
| × | × | × | × | × | × | 0/1 | × | 0 | 1 | 1 | 0/1 |
| × | × | × | × | × | × | × | 0/1 | 1 | 1 | 1 | 0/1 |

FIG.4

| ENCODER 9 | | | | | | | | | | |
|---|---|---|---|---|---|---|---|---|---|---|
| INPUT | | | | | | | | OUTPUT | | |
| A0 | A1 | A2 | A3 | A4 | A5 | A6 | A7 | OUT1 | OUT2 | OUT3 |
| 1 | 0 | 0 | 0 | 0 | 0 | 0 | 0 | 0 | 1 | 0 |
| 0 | 1 | 0 | 0 | 0 | 0 | 0 | 0 | 1 | 1 | 0 |
| 0 | 0 | 1 | 0 | 0 | 0 | 0 | 0 | 0 | 0 | 1 |
| 0 | 0 | 0 | 1 | 0 | 0 | 0 | 0 | 1 | 0 | 1 |
| 0 | 0 | 0 | 0 | 1 | 0 | 0 | 0 | 0 | 1 | 1 |
| 0 | 0 | 0 | 0 | 0 | 1 | 0 | 0 | 1 | 1 | 1 |
| 0 | 0 | 0 | 0 | 0 | 0 | 1 | 0 | 0 | 0 | 0 |
| 0 | 0 | 0 | 0 | 0 | 0 | 0 | 1 | 1 | 0 | 0 |

FIG.5

STUFF SYNCHRONIZATION CIRCUIT

BACKGROUND OF THE INVENTION

The present invention relates to a stuff synchronization circuit and, more particularly, to a stuff synchronization circuit in a pulse stuff synchronization system in which a plurality of asynchronous digital signals are multiplexed. The pulse stuff synchronization system serves to convert a digital signal of a clock frequency $f_L$ into a digital signal of a clock frequency $f_H$ which is asynchronous therewith. The clock frequency $f_H$ is higher than the clock frequency $f_L$.

FIG. 1 shows a stuff synchronization circuit constituting a main component of a conventional pulse stuff synchronization system. An elastic memory 1 allows independent write and read access and has 8 bits. In response to a write clock signal 12 of a frequency $f_L$, a writing counter 2 supplies write pulses $W_1$ to $W_8$ to the memory 1, for write-accessing the first to eighth bits of the elastic memory 1. A digital signal 10 is sequentially written at the first to eighth bit positions of the elastic memory 1 in accordance with the write pulses $W_1$ to $W_8$.

In response to a read clock signal 13 of a frequency $f_H$, which is higher than the frequency $f_L$, a reading counter 3 supplies read pulses $R_1$ to $R_8$ to the memory 1, for read-accessing the first to eighth bits of the elastic memory 1. Accordingly, the digital signal 10, which was written in the elastic memory 1 at the frequency $f_L$, is read out as a digital signal 11 of the frequency $f_H$.

Since the frequency $f_L$ of the write clock signal is lower than the frequency $f_H$ of the read clock signal, the write and read pulses for each bit will coincide periodically over the lapse of time. After a given coincidence of the write and read pulses, the timing of the succeeding read pulse will then become earlier than that of the write pulses, thereby causing a memory slip phenomenon in which a given data bit is read out twice prior to writing of the next data into that bit of the memory. According to the pulse stuff synchronization system, in order to prevent this memory slip phenomenon, one read access is delayed, and at the same time stuff bits are inserted at corresponding positions of the read signal 11. This operation is called stuffing. To perform the stuffing, the stuff synchronization circuit must detect the difference of between the write and read timings at a given time point (to be referred to as the phase comparison time point hereinafter) by detecting a phase difference between them.

In the stuff synchronization circuit in FIG. 1, a D flip-flop 4 serves to perform the above operation. A level of an output signal at a terminal Q of the D flip-flop 4 is set at "1" when an input signal to its terminal T rises while a level of an input signal at its terminal D is set at high level ("1"). The terminal D of the D flip-flop 4 receives the write pulse $W_1$ for write-accessing the first bit of the elastic memory 1, and the terminal T receives the read pulse $R_1$ for read-accessing the first bit of the elastic memory 1.

Since the level of the write pulse $W_1$ is kept at "1" during one period (1 bit) of the write clock signal 12 of the frequency $f_L$, if the phase difference between the write and read timings for accessing the first bit of the elastic memory 1 falls within one bit of the write pulse, the output from the terminal Q of the D flip-flop 4 is set at "1". In other words, the output from the D flip-flop 4 can be used for controlling stuffing. Outputs of levels "1" and "0" from the D flip-flop 4 represent the conditions that stuffing is required and not required, respectively.

A control bit such as a frame bit is normally added to the bits read out from the elastic memory 1, thereby constituting a frame. Generally, stuffing is only performed for a specific bit within a frame. A determination whether stuffing is to be performed in a frame is made at a specific time point (to be referred to as a stuff judgment time point hereinafter), e.g., at the start of the frame. When terminals D and T of a D flip-flop 5 in FIG. 1 respectively receive an output 15 from the terminal Q of the D flip-flop 4 and a signal 14 which rises at the start of each frame, a terminal Q of the D flip-flop 5 outputs a signal 16 which represents a determination made at the start of each frame, i.e., whether stuffing is to be performed or not. When it is set at "1", stuffing is performed, and when at "0", stuffing is not performed.

When stuff control is performed on the basis of a phase difference between the write and read timings of only one given bit in the conventional manner described above, the following problem is posed.

If $f_L = f_H$, a phase difference between the write and read timings for the first bit is equal to that between the write and read pulses for each of the other bits. In practice, however, since $f_L < f_H$, the phase difference between the write and read timings becomes smaller as writing and reading are preformed from the first to eighth bits. When writing and reading are performed with respect to the first bit again, the phase difference becomes even smaller. Therefore, it is preferable to detect a phase difference is with respect to all the bits, and not limiting the detection to only one bit. In spite of the above fact, the stuff synchronization circuit having the arrangement shown in FIG. 1 is widely used. The reason for this is that it is difficult to obtain phase difference information, which varies over time, by detecting the phase difference between the write and read timings with respect to all of the bits.

In a stuff synchronization circuit of the type shown in FIG. 1, the intraframe number of the bit of the elastic memory 1 being written and read out at the stuff judgment time point, i.e., at the start of a frame, is not constant. In addition, the intraframe number of each bit varies in each frame. For example, when reading is performed with respect to the fifth bit of the memory at the stuff judgment time point the first bit in the frame, the phase comparison time point is positioned at a time point five bits before the stuff judgment time point. Accordingly, the stuff judgment is performed on the basis of the phase difference between the write and read timings for the first bit at the phase comparison time point. As a result, even if the phase difference between the write and read timings for the fifth bit is small enough to perform stuffing at the stuff judgment time point, stuffing may not be performed if the phase difference between the write and read timings is not so small at the phase comparison time point.

If a time interval between the stuff judgment time point and the phase comparison time point in each frame is constant, no problem is posed because it only means that the stuff judgment time point is equivalently shifted. In practice, however, the time interval between the stuff judgment time point and the phase comparison time point varies from frame to frame, so stuffing may or may not be performed in a frame in which stuffing should be performed. As a result, a very low frequency jitter is caused, as described in detail in U.S. Pat. No. 4,397,017. Since this very low frequency jitter is not easily removed, the performance of a system to which this pulse stuff synchronization system is applied is degraded.

According to a conventional method disclosed, e.g., in the above publication as a countermeasure against the jitter, the number of bits of the elastic memory 1 is carefully selected so as to minimize the amplitude of the very low frequency jitter. However, the method can only minimize the amplitude of the very low frequency jitter; it cannot prevent the very low frequency jitter.

SUMMARY OF THE INVENTION

It is an object of the present invention to solve the above problem in the conventional stuff synchronization circuit and provide a stuff synchronization circuit in which the time interval between the stuff judgment time point and the phase comparison time point can be kept constant.

A stuff synchronization circuit according to the present invention comprises a memory in which writing and reading are performed at different timings, phase comparison means for detecting a phase difference between a write timing for a specific bit included in data input to the memory and a read timing for the specific bit, stuff judgment means for judging an insertion timing of stuff pulses on the basis of the detected phase difference, and control means for keeping a time interval between a time at which the phase difference is detected by the phase comparison means and a time at which the insertion timing of stuff pulses is judged by the stuff judgment means constant.

BRIEF DESCRIPTION OF THE DRAWINGS

FIG. 2 is a block diagram showing an embodiment of the present invention;

FIGS. 4 and 5 are truth tables for explaining the embodiment in FIG. 2.

DETAILED DESCRIPTION OF THE PREFERRED EMBODIMENTS

An embodiment of the present invention will be described in detail below, with reference to the accompanying drawings.

Figure 1:
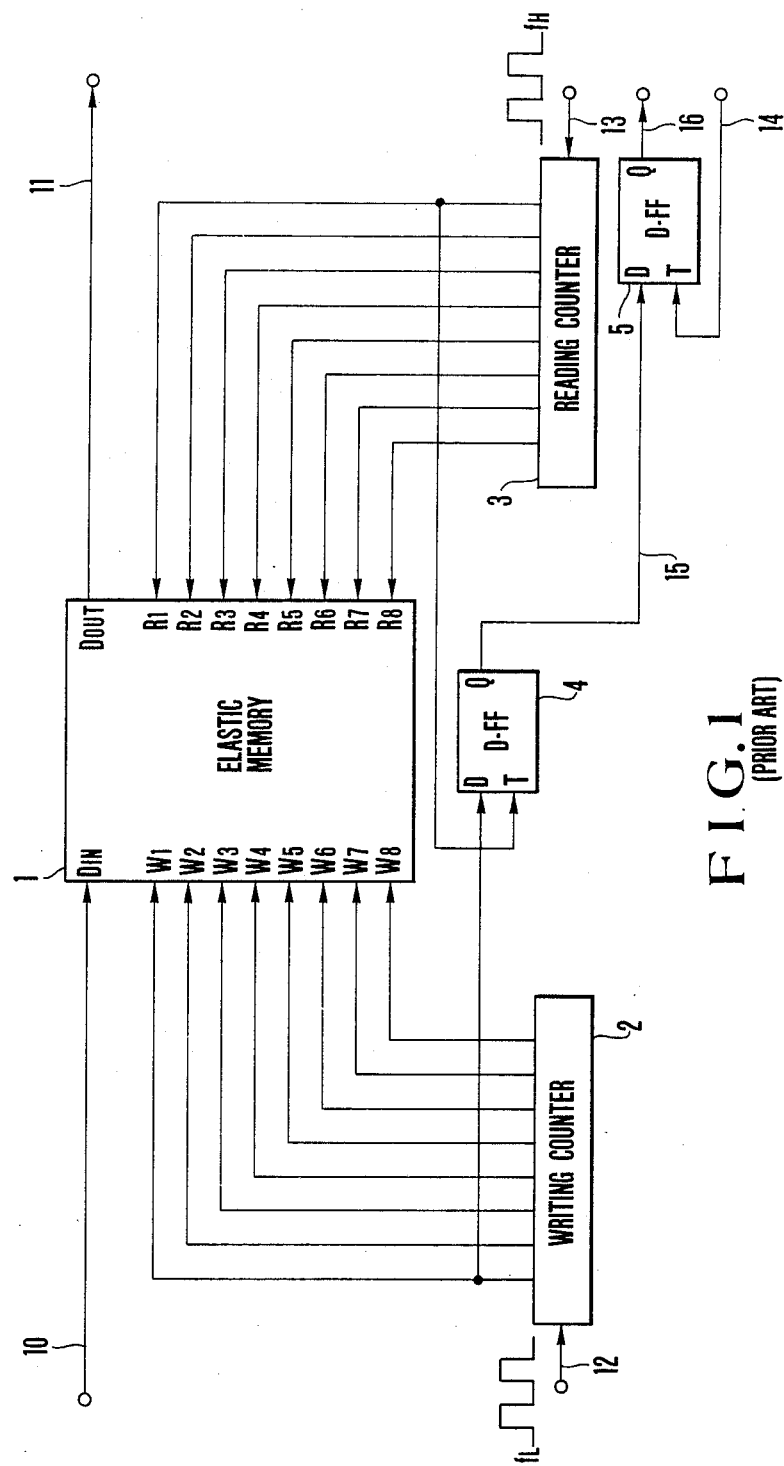
FIG. 1 is a block diagram showing a conventional stuff synchronization circuit.

FIG. 2 shows a basic arrangement of a stuff synchronization circuit according to an embodiment of the present invention. The same reference numerals in FIG. 1 and FIG. 2 denote the same parts. A D flip-flop 4 serves to compare a phase difference between write and read timings in an elastic memory 1. A D flip-flop 5 is used for stuff judgment. Input signals 14 and 17 to terminals T of the D flip-flop 5 and a D flip-flop 8 are respectively synchronous with a read clock signal 13 input to a reading counter 3.

Selectors 6 and 7 are arranged identically in the circuit in FIG. 2. Each of them has input terminals $n_0$ to $n_7$, an output terminal Y, and control terminals a, b, and c. One of the eight input terminals $n_0$ to $n_7$ is selected by a 3-bit signal 18 input to the control terminals a, b, and c. Then, the selected input terminal is connected to the output terminal Y.

The input terminals $n_0$ to $n_7$ of the selector 6 receive write pulses $W_1$ to $W_8$ from a writing counter 2. The control terminals a, b, and c of the selector 6 receive a 3-bit output signal 18 from an encoder 9 to be described later. The output terminal Y of the selector 6 is connected to a terminal D of the D flip-flop 4.

The input terminals $n_0$ to $n_7$ of the selector 7 receive read pulses $R_1$ to $R_8$ from the reading counter 3. The output signal 18 from the encoder 9 is input to the control terminals a, b, and c of the selector 7. The output terminal Y of the selector 7 is connected to an input terminal T of the D flip-flop 4. The output terminal of the D flip-flop 4 is connected to the input terminal D of the D flip-flop 5. The input terminal T of the D flip-flop 5 receives the signal 14 representing the stuff judgment time point.

The D flip-flop 8 has eight input terminals $D_1$ to $D_8$, output terminals $Q_1$ to $Q_8$ corresponding to the input terminals, and an input terminal T. The read pulses $R_1$ to $R_8$ from the reading counter 3 are respectively supplied to both the input terminals $D_1$ to $D_8$ of the D flip-flop 8 and the input terminals $n_0$ to $n_7$ of the selector 7. The output terminals $Q_1$ to $Q_8$ of the D flip-flop 8 are respectively connected to input terminals $A_0$ to $A_7$ of the encoder 9. The input terminal T of the D flip-flop 8 receives a signal 17 synchronized with the read clock 13. If a signal input to one of the input terminals $D_1$ to $D_8$ of the D flip-flop 8 is "1", the input signal is output from a corresponding one of the output terminals $Q_0$ to $Q_7$ of the D flip-flop 8 when the signal 17 input to the input terminal T rises.

The encoder 9 encodes 8-bit data input to the input terminals $A_0$ to $A_7$ into 3-bit data, and outputs it from the output terminals OUT1, OUT2, and OUT3. The output terminals OUT1, OUT2, and OUT3 are respectively connected to the control terminals a, b, and c of the selectors 6 and 7. Thus, the 3-bit control signal 18 is supplied from the encoder 9 to the selectors 6 and 7, respectively.

The input terminal T of the D flip-flop 5 receives a signal 14 to the input terminal T, the signal 14 being delayed from the input signal 17 by an interval corresponding to, e.g., 12 clock cycles of the read clock 13.

An operation of the stuff synchronization circuit in FIG. 2 will be described below.

Figure 3:
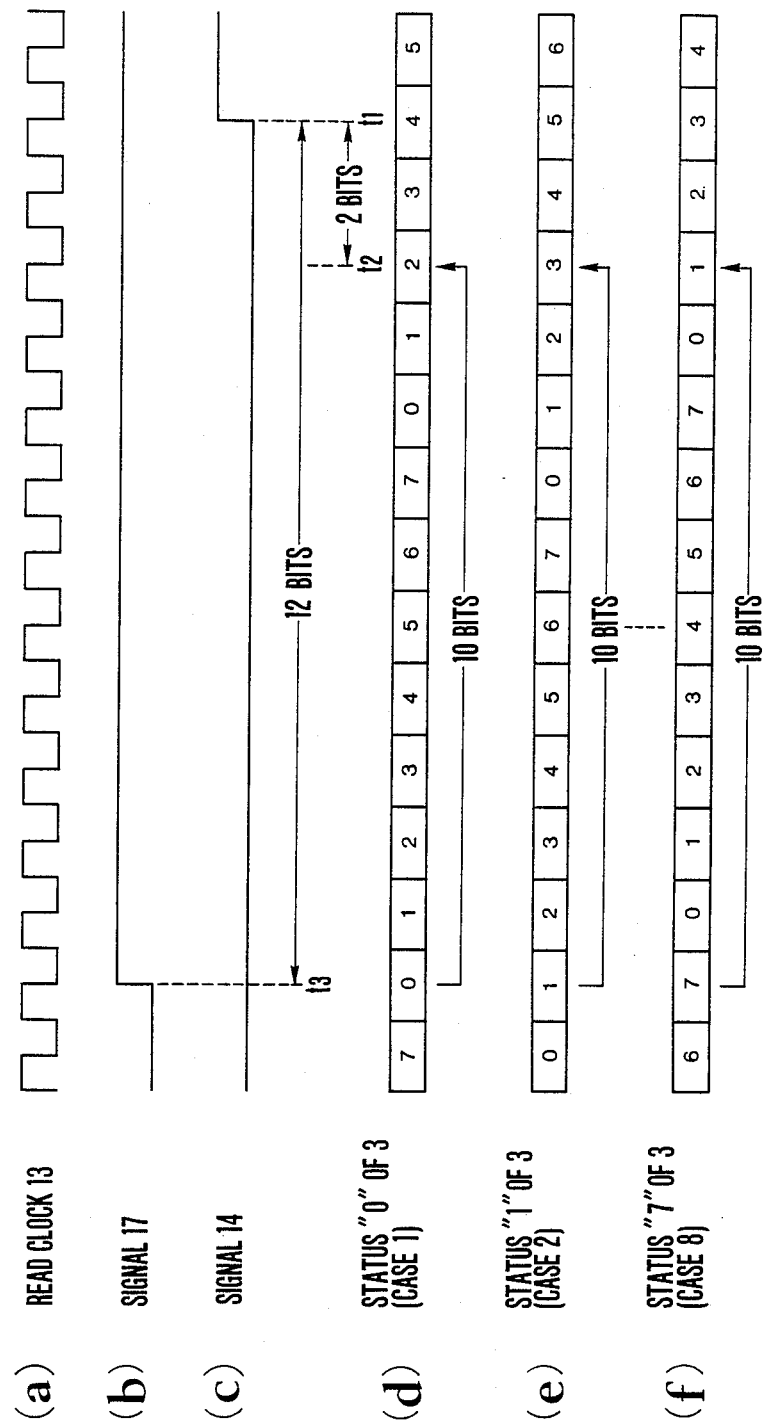
FIGS. 3(a) to 3(f) are timing charts for explaining the embodiment in FIG. 2.

FIGS. 3(a) to 3(c) are waveforms of the read clock 13 supplied to the reading counter 3, the signal 17 input to the input terminal T of the D flip-flop 8, and the signal 14 input to the input terminal T of the D flip-flop 5, respectively. A leading edge $t_1$ of the signal 14, a leading edge $t_3$ of the signal 17, and a time point $t_2$ respectively correspond to a stuff judgment time point, a read timing of the elastic memory 1, and a phase comparison time point to be described later.

FIGS. 3(d) to 3(f) respectively show statuses "0", "1", and "7" of the eight possible statuses "0" to "7" of the reading counter 3.

FIGS. 4 and 5 are truth tables for explaining the selector 7 and the encoder 9, respectively.

In the embodiment, the phase comparison time point $t_2$ is set to always precede the stuff judgment time point $t_1$ by two bits of the read clock 13. Thus, phase comparison is performed at a time point 10 bits after the read time point $t_3$ in each of the eight statuses "0" to "7" of the reading counter 3. In case 1 shown in FIG. 3(d), the D flip-flop 8 latches the status "0" of the reading counter 3. That is, the 0th bit in the elastic memory 1 is read out at this point. Since $(0+10) \mod 8 = 2$, "2" is input to the encoder 9, so that phase comparison is performed with respect to the write and read pulses for the second bit of the elastic memory 1 using the selector 7 controlled by outputs from the encoder 9. As a result, the difference between the stuff judgment time point $t_1$ and the phase comparison time point $t_2$ becomes two bits. In case 2 shown in FIG. 3(e), the D flip-flop 8 latches the status "1" of the reading counter 3. Since $(1+10)$ mod $8=3$, phase comparison is performed with respect to the write and read pulses for the third bit of the elastic memory 1. Then, in this case too, the difference between the stuff judgment time point $t_1$ and the phase comparison time point $t_2$ becomes two bits. Accordingly, the difference between the stuff judgment time point and the phase comparison time point can be set to be two bits for all the subsequent bits. Assume that the truth table of the selector 7 is set as shown in FIG. 4, and when the D flip-flop 8 latches the status "0" of the reading counter 3, the output Q1 is set at "0", and when the D flip-flop 8 latches the status "1", the output Q2 is set at "1", and the subsequent cases are similarly assumed. The truth table of the encoder 9 can be set as shown in FIG. 5. This operation can be realized by, e.g., a ROM.

As has been described above, according to the present invention, the time interval at the phase comparison time point is set to be two bits, and is not varied. Therefore, no very low frequency jitter is caused.

In the above embodiment, the leading edge of the signal input to the input terminal T of the D flip-flop 8 is set to precede the leading edge of the signal input to the input terminal T of the D flip-flop 5 by 12 bits of the read clock. However, the number of bits is not limited to 12, and the present invention can be executed even if the number is changed as needed. In addition, although in the embodiment, the time interval between the stuff judgment time point and the phase comparison time point is set to be two bits, even if the number of bits is changed as needed, the present invention can be executed. Furthermore, although in the embodiment, the phase comparator detects that the phase difference between write and read timings in the elastic memory becomes less than 1 bit, the phase difference to be detected need not be limited to 1 bit. The present invention can be executed regardless of the maximum number of bits of the phase difference to be detected by the phase comparator.

What is claimed is:

1. A stuff synchronization circuit comprising:
    a memory in which writing and reading are performed at different timings;
    phase comparison means for detecting a phase difference between a write timing for a specific bit included in data input to said memory and a read timing for the specific bit;
    stuff judgment means for judging an insertion timing of stuff pulses on the basis of the detected phase difference;
    and control means for keeping a time interval between a time at which the phase difference is detected by said phase comparison means and a time at which the insertion timing of stuff pulses is judged by said stuff judgment means constant.

2. A stuff synchronization circuit comprising:
    a memory in which digital data is serially written in response to parallel outputs from a writing counter operated by a write clock of a first frequency, the written data is serially read out as digital data in response to parallel outputs from a reading counter operated by a read clock of a second frequency higher than the first frequency;
    phase comparison means for detecting a phase difference between write and read timings for a specific bit of said memory with respect to the read clock;
    stuff judgment means for judging a timing for inserting stuff bits into the data read out from said memory on the basis of the phase difference detected by said phase comparison means; and
    control means for keeping a time interval between a time at which the phase difference is detected by said phase comparison means and a time at which a stuff bit insertion timing is judged by said stuff judgment means at a predetermined value.

3. A stuff synchronization circuit comprising:
    a memory in which digital data is serially written in response to parallel outputs from a writing counter operated by a write clock of a first frequency, the written data being serially read out as digital data in response to parallel outputs from a reading counter operated by a read clock of a second frequency higher than the first frequency;
    phase comparison means for detecting a phase difference between write and read timings for a specific bit of said memory with respect to the read clock;
    stuff judgment means for judging a timing for inserting stuff bits into the data read out from said memory on the basis of the phase difference detected by said phase comparison means; and
    control means for keeping a time interval between a time at which the phase difference is detected by said phase comparison means and a time at which a stuff bit insertion timing is judged by said stuff judgment means at a predetermined value;
    wherein said phase comparison means comprises a first D flip-flop receiving pulse outputs corresponding to the specific bit of said writing and reading counters and outputting a signal representing that the phase difference between the pulse outputs falls within a predetermined time interval.

4. A circuit according to claim 3, wherein said stuff judgment means comprises a second D flip-flop receiving the output signal from said first D flip-flop and a first clock signal and outputting a signal representing the stuff pulse insertion timing.

5. A stuff synchronization circuit comprising:
    a memory in which digital data is serially written in response to parallel outputs from a writing counter operated by a write clock of a first frequency, the written data being serially read out as digital data in response to parallel outputs from a reading counter operated by a read clock of a second frequency higher than the first frequency;
    phase comparison means for detecting a phase difference between write and read timings for a specific bit of said memory with respect to the read clock; comprising a first D flip-flop receiving pulse outputs corresponding to the specific bit of said writing and reading counters and outputting a signal indicating when the phase difference between the pulse outputs falls within a predetermined time interval;
    stuff judgment means for judging the inserting of stuff bits into the data read out from said memory on the basis of the phase difference detected by said phase comparison means; wherein said stuff judgment means comprises a second D flip-flop receiving the output signal from said first D flip-flop and a first clock signal and outputting a signal representing the stuff pulse insertion timing; and control means for holding constant a time interval between a time at which the phase difference is detected by said phase comparison means and a time at which a stuff bit insertion is judged by said stuff judgment means at a predetermined value;

wherein said control means comprises encoder means for encoding the parallel outputs from said reading counter according to a predetermined algorithm on the basis of a second clock signal preceding the first clock signal by m bits of the read clock, and selector means for supplying an output to said phase comparison means, the output having a predetermined relationship with an output signal from said encoder means and an output from said reading counter.

6. A circuit according to claim 5, wherein said encoder means and said selector means comprise means for converting the bits of said memory corresponding to the second clock signal into bits corresponding to a timing preceding the first clock signal by the predetermined time interval.

7. A stuff synchronization circuit comprising:
a memory; means for performing writing and reading of said memory at different timings;

phase comparison means for detecting a phase difference at a phase comparison time point $t_2$ between a write timing for a specific bit included in data input to said memory and a read timing for the same specific bit;

stuff judgment means for judging a timing at a stuff judgment time point $t_1$ for insertion of stuff pulses on the basis of the detected phase difference; and control means for keeping constant a time interval $(t_2-t_1)$ between said time at which the phase difference is detected by said phase comparison means and said time at which the timing for insertion of stuff pulses is judged by said stuff judgment means.

8. A stuff synchronization circuit comprising:
a memory; means for writing digital data serially in said memory in response to parallel outputs from a writing counter which is responsive to a write clock signal of a first frequency; means for reading the written data serially out from said memory as digital data in response to parallel outputs from a reading counter which is responsive to a read clock signal of a second frequency higher than the first frequency;

phase comparison means for detecting a phase difference at a phase comparison time point $t_2$ between write and read timings for a specific bit of said memory;

stuff judgment means for judging a timing at a stuff judgment time point $t_1$ for inserting stuff bits into the data read out from said memory on the basis of the phase difference detected by said phase comparison means; and control means for keeping a time interval $(t_2-t_1)$ between said time at which the phase difference is detected by said phase comparison means, and said time at which the stuff bit insertion timing is judged by said stuff judgment means, at a predetermined value.

9. A stuff synchronization circuit comprising:
a memory; means for writing digital data serially in said memory in response to parallel outputs from a writing counter which is responsive to a write clock signal of a first frequency; means for reading the written data serially out from said memory as digital data in response to parallel outputs from a reading counter which is responsive to a read clock signal of a second frequency higher than the first frequency;

phase comparison means for detecting a phase difference at a phase comparison time point $t_2$ between write and read timings for a specific bit of said memory;

stuff judgment means for determining at a stuff judgment time point $t_1$ whether to insert stuff bits into the data read out from said memory on the basis of the phase difference detected by said phase comparison means; and control means for keeping constant a time interval $(t_2-t_1)$ between said time at which the phase difference is detected by said phase comparison means, and said time at which the stuff bit insertion is determined by said stuff judgment means, at a predetermined value;

wherein said phase comparison means comprises a first D flip-flop receiving pulse outputs of said writing and reading counters corresponding to said specific bit of the memory and outputting a signal indicating whether the phase difference between the pulse outputs falls within a predetermined time interval;

wherein said stuff judgment means comprises a second D flip-flop receiving the output signal from said first D flip-flop and a first clock signal and outputting a signal representing the stuff pulse insertion decision;

wherein said control means comprises encoder means for encoding the parallel outputs from said reading counter according to a predetermined algorithm on the basis of a second clock signal preceding the first clock signal by m bits of the read clock, and selector means for supplying an output to said phase comparison means, the output having a predetermined relationship with an output signal from said encoder means and an output from said reading counter.

10. A circuit according to claim 9, wherein said encoder means and said selector means comprise means for converting the bits of said memory corresponding to the second clock signal into bits corresponding to a timing preceding the first clock signal by the predetermined time interval.

* * * * *